United States Patent [19]

Mullersman et al.

[11] Patent Number: 4,698,578

[45] Date of Patent: Oct. 6, 1987

[54] CIRCUIT FOR SUPPLYING ENERGY FROM A BATTERY TO AN ENERGY-USING DEVICE

[75] Inventors: Ferdinand H. Mullersman, Gainesville, Fla.; Mark E. McClelland, Alameda, Calif.

[73] Assignee: Gates Energy Products, Denver, Colo.

[21] Appl. No.: 866,675

[22] Filed: May 27, 1986

[51] Int. Cl.$^4$ ............................................... H02J 7/00
[52] U.S. Cl. ........................................ 320/13; 320/18; 320/39; 307/66
[58] Field of Search ...................... 320/17, 18, 15, 16, 320/1, 13, 39, 40; 323/906; 307/64, 66, 84

[56] References Cited

U.S. PATENT DOCUMENTS

| | | | |
|---|---|---|---|
| 3,707,664 | 12/1972 | Esch | 320/18 |
| 3,871,383 | 3/1975 | Lee | 320/13 X |
| 3,975,670 | 8/1976 | McDermott | 320/18 X |
| 4,091,395 | 5/1978 | Kozuki et al. | 307/66 X |
| 4,181,842 | 1/1980 | Elias et al. | 307/66 |
| 4,530,550 | 7/1985 | Kondo | 320/1 X |

Primary Examiner—R. J. Hickey
Attorney, Agent, or Firm—C. H. Castleman, Jr.; H. W. Oberg, Jr.; F. P. Grassler

[57] ABSTRACT

A circuit for supplying energy from a battery to the load of an energy-using device is provided wherein the circuit provides for notification to the operator of the device that the remaining energy of the battery is low. The notification is provided at a time when sufficient energy remains in the battery for the operator to perform certain essential tasks. The circuit includes a battery having a plurality of cells connected in series, a first portion of which have a higher deliverable energy capacity than a second portion of the plurality of cells. The circuit further provides for sensing a characteristic of the battery indication of the remaining deliverable energy capacity lower deliverable capacity cell portion and for switching the circuit from a first mode of operation wherein energy is delivered to the load from all of the cells in the plurality to a second mode of operation wherein the energy is delivered to the load from only the higher capacity portion of cells. Switching is accomplished in response to the sensed characteristic indicating a low level of remaining deliverable energy capacity in the battery. Energy delivered to the load in the second mode of operation may be used by the operator to perform certain essential tasks before the device becomes inoperable for lack of energy.

5 Claims, 4 Drawing Figures

CIRCUIT FOR SUPPLYING ENERGY FROM A BATTERY TO AN ENERGY-USING DEVICE

FIELD OF THE INVENTION

This invention relates to a circuit for supplying energy from a battery to an energy-using device and more particularly, to a circuit which provides notification to the user of the energy-using device that the remaining energy available from the battery is low and thereafter provides a sufficient amount of energy for the user to accomplish a specific task.

BACKGROUND OF THE INVENTION

Many energy-using devices heretofore operated from conventional electrical wall sockets are being adapted to operate from energy supplied by batteries comprised of one or more electrochemical cells. Such adaptation provides such energy-using devices with the feature of portability; that is to say, the device has a self-contained energy source and may be operated at locations remote from electrical wall sockets. Further adaptation of energy-using devices for compatability with rechargeable type batteries provides additional convenience for the user especially if the device includes means for recharging of the batteries.

In some energy-using devices powered by a battery, it is critically important to notify the user of the device that the battery is nearly depleted of energy. If so notified, the user may use the remaining energy to operate the device to complete various tasks before the device becomes inoperable for lack of sufficient power. For example, a portable computer is one device where such notification is essential. A user of a portable computer needs to be forewarned of imminent exhaustion of battery energy at a point in time when a specific amount of energy is still available from the battery. Such a warning may be necessary, for example, to enable the user to the portable computer to transfer files and data, stored in the volatile working memory of the portable computer, to a permanent memory such as a tape or a disk before the deliverable battery energy is depleted. If the user is not provided with sufficient energy to accomplish this task, the files and data stored in the volatile memory of the personal computer will be lost.

One approach that has been used to ensure that the user of a portable computer has sufficient energy remaining to accomplish a specific task is to simply supply a second back-up battery to provide powering of the device once the first battery is depleted. In the past, this approach has not proved to be entirely commerically satisfactory since the addition of a back-up battery to the system reduces the system's reliability, requires additional charging means, adds additional cost to the charging system and requires that additional space in the portable computer be made available to house the battery. For example, a portable computer using a rechargeable 12 volt battery would require ten rechargeable nickel-cadmium cells each providing 1.2 volts. A back-up battery providing the same 12 volt energy supply would also require ten individual cells. The increased cost, added space requirement and decrease in reliability introduced into the battery supply system by the addition of a ten cell back-up battery makes this solution to the problem commercially unacceptable in many applications.

Another approach that has been used to ensure that the user of a portable computer has sufficient energy available to accomplish a specific task involves measuring the amount of energy delivered by the battery and warning the user when the measured delivered energy reaches a predetermined value. This approach involves integration of the charge added and charge removed from the battery and, accordingly, is commercially unattractive due to system complexity and cost.

Another approach used in the prior art with batteries having appropriate discharge characteristics, involves measuring a discharge parameter of the battery to obtain an indication of the amount of energy remaining in the battery and then warning the operator of an energy using device when the energy has been depleted to a low level. This approach is unsuited for some batteries, for example, nickel-cadmium batteries. While nickel-cadium rechargeable batteries are well adapted to provide energy to many portable energy-using devices, a nickel-cadmium battery does not have a discharge parameter the measurement of which would provide a reliable indication of the level of remaining energy in the battery. Typically, a nickel-cadmium battery is usually comprised of a plurality of rechargeable nickel-cadmium cells of the same deliverable energy capacity electrically connected in series. A battery so comprised provides a substantially constant voltage during battery discharged. As the battery is discharged, the same amount of energy is removed from each of the cells. Thus, near the end of total discharge of the battery all of the energy from each cell has been depleted and the previously constant voltage falls at an extremely rapid rate below a voltage which may not properly operate the energy-using device. Because the voltage of a nickel-cadmium battery remains constant until such time as the energy has been depleted from each of its cells, it is very difficult, if not practically impossible to use the voltage of the battery to detect the imminent depletion of energy of the cell and yet ensure that sufficient energy remains to perform a specific task.

SUMMARY OF THE INVENTION

It is therefore an object of the present invention to provide a circuit for supplying energy from a battery to the load of an energy-using device.

It is another object of the present invention to provide a battery energy supply circuit having means for determining when the remaining energy in the battery is low and thereafter notifying the user of the energy-using device thereof.

It is yet another object of the present invention to, after the aforementioned notification, supply the user of the energy-using device with a sufficient amount of additional energy which may be used to complete various tasks before the device is shut off.

It is still another object of the present invention to provide a battery energy supply circuit in which the voltage of at least one cell in a multi-cell nickel-cadmium battery may be used to reliably provide an indication of the remaining energy in the battery.

It is still another object of the present invention to provide such additional energy at a minimum of cost and without introducing complex circuitry.

Briefly stated, these and other objects, as well as advantages, which will become apparent hereinafter, are accomplished by the present invention which, in one form, provides a circuit for supplying energy to the load of an energy-using device wherein the circuit comprises a battery having a plurality of electrochemical cells connected in series. The plurality of cells is comprised of a first portion and a second portion with each cell in the first portion having a deliverable energy capacity in excess of the deliverable energy capacity of each cell in the second portion. The circuit is operable in a first mode to simultaneously deliver energy from each of the cells in the plurality of cells to the load and further operable in a second mode to deliver energy to the load from only the first higher-capacity portion of the plurality of cells. The circuit further includes means for sensing, during the first mode of operation, a characteristic of the second lower-capacity portion of the plurality of cells which is indicative of the remaining energy in the second lower-capacity portion of the cell plurality. Switching means are provided in the circuit for switching the mode of operation from the first mode to the second mode in response to the sensed characteristic indicating a low level of remaining deliverable energy in the second lower-capacity portion of said plurality of cells. The circuit may further include means for notifying the operator of the energy-using device that the circuit is in the second mode of operation whereby the user may use the remaining energy in the first portion of cells to complete various tasks before shutting the energy-using device off.

DESCRIPTION OF THE DRAWINGS

While the specification concludes with claims particularly pointing out and distinctly claiming the present invention, the invention will be more readily understood from the following description of the preferred embodiments which are given by way of example with the accompanying drawings in which:

DESCRIPTION OF THE PREFERRED EMBODIMENTS

Figure 1:
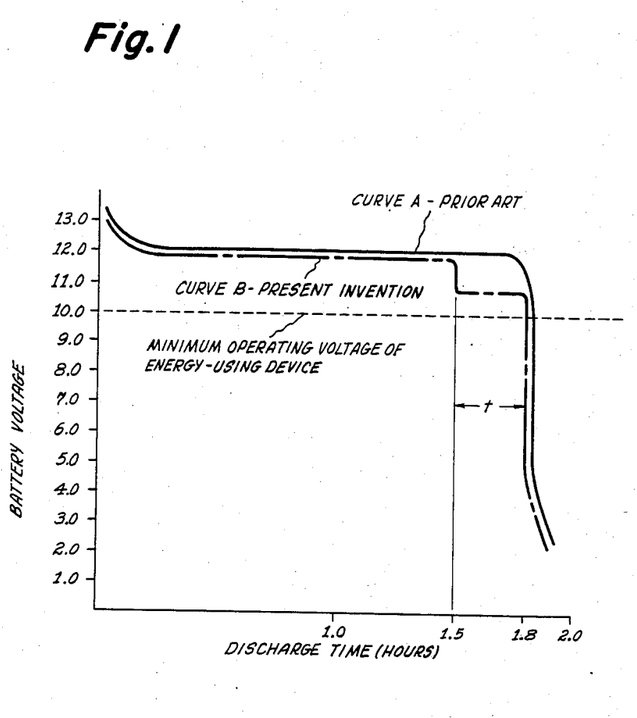
FIG. 1 depicts a schematic graphical representation of the discharge characteristics of a nickel-cadmium battery of construction known in the art and a nickel-cadmium battery particularly useful in the circuit comprising the present invention.

Referring now to FIG. 1, there is depicted a schematic graphical representation of the discharge characteristics of two batteries. Curve A shows the discharge characteristics of a battery comprised of a standard type of construction wherein each cell of the battery has the same deliverable energy capacity. Curve B, on the other hand, shows the discharge characteristics of a battery particularly well suited for use in the circuit comprising the present invention wherein the battery has one cell of a deliverable energy capacity less than the remaining cells of which the battery is comprised. Beyond this difference, the batteries of curves A and B are quite similar. Each battery is comprised of 10 individual electrochemical nickel-cadmium cells connected in series. Each cell of each battery provides a nominal discharge voltage of 1.2 volts whereby each 10 cell nominal battery thus provides a battery voltage of 12 volts. The horizontal dashed line of FIG. 1 depicts the minimum operating voltage of the energy-using device selected, for purposes of illustrating the present invention, at 10 volts. Thus, for battery supplied voltages of below 10 volts the energy-using device will either not operate or its function will be impaired.

For the purpose of facilitating an understanding of the circuit comprising the present invention, it is useful to compare curve A with curve B. FIG. 1 illustrates battery voltage as a function of discharge time for a nickel-cadmium battery. Curve A depicts the voltage/time relationship for a 10-cell nickel-cadmium battery wherein each cell of the battery has the same deliverable energy capacity. That is to say, each cell has the same amount of electrochemically active materials utilized in the storage and delivery of energy during charging and discharging of the battery. For purposes of illustration, each cell of the battery of curve A has been selected to have a deliverable energy capacity of 1.8 ampere-hours. It is assumed for purposes of illustration, that the battery of curve A is discharged at a rate of 1 amphere.

As is readily observed from FIG. 1, as the battery of curve A provides energy to the energy-using device at a rate of 1 ampere, the battery delivers a relatively constant voltage of 12 volts (1.2 volts per cell times 10 cells) to the energy-using device. However, at approximately 1.8 hours after discharge of the battery has been initiated, the stored energy in the cell has been nearly depleted whereupon the voltage of the battery of curve A rapidly decreases as shown by the nearly vertical portion of curve A. Because the voltage of the battery of curve A remains constant until almost all of the energy of the battery has been depleted, the voltage of battery A is not suitable as a parameter whose measurement can be readily used to indicate the remaining deliverable energy capacity of the battery. This conclusion obtains since the energy of the battery is almost totally depleted before any substantial or reliably detectable change in battery voltage occurs. Thus, at the time a meaningful change in battery voltage can be detected, there is no longer sufficient energy in the battery which would otherwise permit the user of the energy-using device to perform various remaining tasks. On the contrary, the voltage of the battery rapidly decreases to a level below the minimum operating voltage of the energy-using device. If the energy-using device is a portable computer insufficient time may not remain for the user to transfer data and files from the volatile memory of the computer to a tape or disk. Thus, valuable information previously entered or developed in the computer may be lost.

On the other hand, the present invention overcomes the difficulties and deficiencies associated with the prior art approaches for providing the user of an energy-using device with an indication of remaining deliverable energy capacity at a time when sufficient deliverable energy still remains in the battery for the user to accomplish the completion of sufficient tasks. Referring now to curve B of FIG. 1, there is depicted the voltage/time relationship for a 10-cell nickel-cadmium battery which, in combination with a circuit hereinafter to be more fully explained, accomplishes the objectives mentioned above. More specifically, each of 9 cells of the 10-cell battery of curve B have the same deliverable energy capacity. Moreover, the deliverable energy capacity of each of the 9 cells is in excess of the deliverable energy capacity of the 1 remaining cell of the 10-cell battery. For purposes of illustration, it can be each of the 9 cells has been selected to have a deliverable energy capacity of 1.8 ampere-hours and that the remaining 1 cell of the 10-cell battery has been selected to have a deliverable energy capacity of 1.5 ampere-hours. It may be further assumed, for purposes of illustration, that the battery of curve B is discharged at a rate of 1 ampere.

As is readily observed from FIG. 1, as the battery of curve B provides energy to the energy-using device at a rate of 1 ampere, the battery of curve B, like the battery of curve A, delivers a relatively constant voltage of 12 volts (curves A and B have been offset slightly to make them more discernible). However, at approximately 1.5 hours after discharge of the battery has been initiated, the stored energy in the 1 cell having the lesser deliverable energy capacity of 1.5 ampere hours has been substantially depleted whereupon the voltage of the one cell rapidly decreases as shown by the near vertical portion of curve B at time 1.5 hours. However, unlike the battery of curve A, the battery of curve B still has nine cells with substantial deliverable energy capacity remaining. These nine cells continue to deliver a battery voltage of 10.8 volts (1.2 volts per cell times 9 cells) to the energy-using device. The nine cells of higher capacity will continue to deliver 10.8 volts, which is above the minimum operating voltage of the energy-using device, until approximately time 1.8 hours, whereupon the energy of the 9 higher capacity cells will have been depleted and the voltage of battery B rapidly decreases (as shown by the nearly vertical portion of curve B at time 1.8 hours) below the minimum operating voltage of the energy-using device.

As may be readily observed, the battery of curve B provides an increment of time t between the decrease in voltage of the 1 cell of lower capacity and the decrease in voltage of the remaining 9 cells of higher capacity. During time interval t, the 9 cells of higher capacity are still delivering energy to the load of an energy-using device at 10.8 volts which is above the minimum operating voltage of the energy-using device. Thus, during time interval t, sufficient energy is delivered to the load of the energy-using device to enable the operator to perform various tasks before the voltage supplied by the battery falls below the minimum operating voltage. For the cells illustrated in this example, time interval t is equal to 18 minutes (1.8 hours minus 1.5 hours). Finally, because a readily detectable drop in battery voltage occurs when the voltage of the lower capacity cell substantially decreases (at time 1.5 hours), the drop in voltage may be sensed by appropriate circuitry and used to initiate a notification to the operator that only a limited amount of time or remaining energy is available before the battery voltage falls below the minimum operating voltage of the energy-using device.

Figure 2:
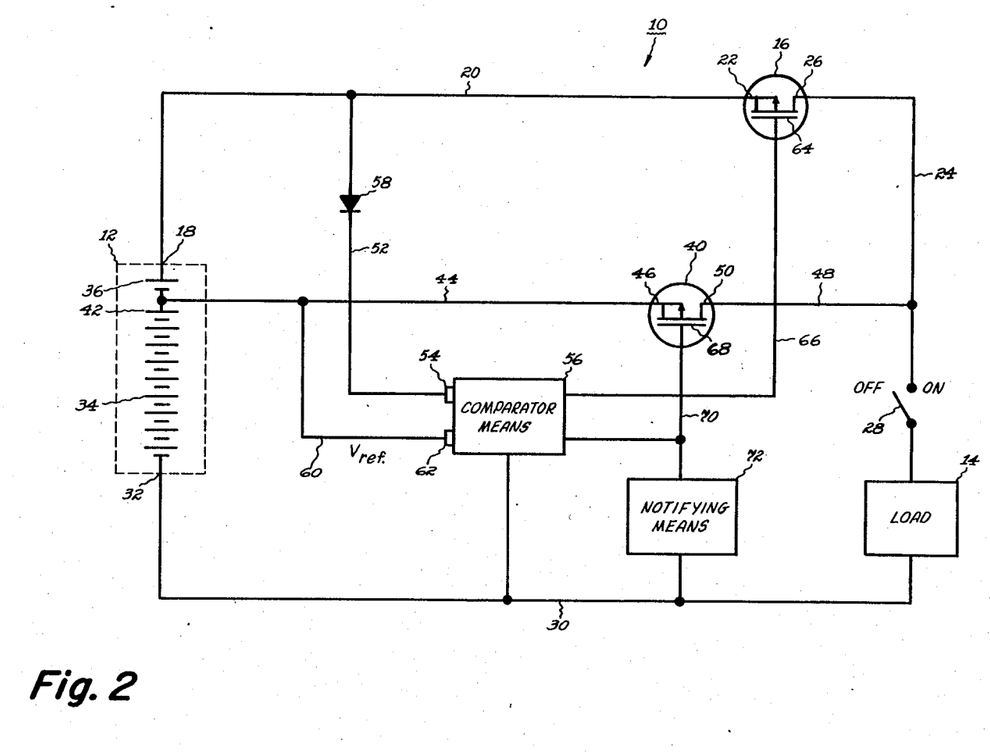
FIG. 2 depicts a schematic circuit diagram of one embodiment of the present invention.

Referring now to FIG. 2, there is depicted, generally at 10, a circuit for delivering or supplying electrical energy from a rechargeable battery 12 to the load 14 of an energy-using device. Circuit 10 comprises battery 12 connected in series with load 14 via a first switch 16 in the form of a metal oxide semiconductor field effect transistor (MOSFET). More specifically, the positive terminal 18 of battery 12 is connected to load 14 via a first circuit path including a current conducting line 20, connecting positive terminal 18 to the source terminal 22 of transistor 16. The first circuit path further includes a second current conducting line 24 connecting the drain terminal 26 of transistor 16 to load 14 via the load on-off switch 28. The first circuit path further includes a current conducting line 30 connecting load 14 to the negative terminal 32 of battery 12. Thus, with switch 28 in the on-position and with transistor switch 16 in the conducting state, current is supplied from battery 12 to load 14 through line 20, transistor 16, line 24, and switch 28.

In accordance with the present invention, battery 12 is comprised of a plurality of electrochemical cells connected in series with respect to each other and with respect to load 14. The plurality of cells of battery 12 is comprised of a first battery or cell portion 34 of cells each having a deliverable energy capacity in excess of the deliverable energy capacity of each cell in a second battery or cell portion of cells 36. In the embodiment of FIG. 2, the number of cells in first higher-capacity portion 34 is greater than the number of cells in second lower-capacity portion 36. Consequently, the voltage across battery portion 34 is greater than the voltage across battery portion 36. Circuit 10 is operable in a first mode of operation to deliver energy to load 14 simultaneously from each cell of the plurality of cells comprising battery 12. That is to say, in the first mode of operation energy is delivered to load 14 simultaneously from each cell in battery portion 34 and battery portion 36.

Circuit 10 is further operable in a second mode of operation to deliver energy to the load 14 from only the battery portion 34; that is to say only from the battery portion 34 having the higher capacity electrochemical cells. In this second mode of operation, electrical current is supplied from battery 12 to load 14 via a second switch 40 in the form of a second metal oxide semiconductor field effect transistor. More specifically, the positive terminal 42 of battery portion 34 is connected to load 14 via a second circuit path including first current conducting line 44 connecting positive terminal 42 to the source terminal 46 of transistor switch 40. The second circuit path further includes a second current conducting line 48 connecting the drain terminal 50 of transistor switch 40 with current conducting line 24 and thus load 14. The second path further comprises current conducting line 30 connecting load 14 to the negative terminal of battery 12 and battery portion 34.

Thus, in the second mode of operation with transistor switch 16 in the non-conducting state and with transistor switch 40 in the conducting state, energy is delivered to load 14 only from battery portion 34. In this second mode, current is supplied from battery portion 34 to load 14 through line 44, transistor switch 40, line 48, line 24 and switch 28. It should be noted that MOSFET transistors are used in lieu of bipolar transistors in order to avoid a continuous drain of the battery which would otherwise result from the base current drive requirements of bipolar transistors.

In order to permit selective determination of alternative operation of circuit 10 in either the first or second mode of operation, circuit 10 is provided with sensing and comparing means in a manner now to be described. As heretofore set forth, it is the purpose of the present invention to provide for notification to the operator of an energy-using device, that only a limited amount of remaining battery energy is available before the energy-using device becomes inoperable. As set forth with respect to the description of FIG. 1, battery 12 is comprised of a higher capacity cell portion 34 and lower capacity cell portion 36 which may be used as a basis for providing such notification. To this end notification is provided when second lower-capacity battery portion 34 is nearly depleted of energy and thereafter the load 14 is supplied with the remaining energy in first higher-capacity battery portion 36. More specifically, by monitoring or sensing the voltage of battery 12 an indication can be obtained of the time at which the deliverable energy capacity of cell portion 36 of battery 12 becomes substantially depleted. This event is apparent by the rapid drop in voltage of the cell or cells in portion 36. Yet, upon the occurrence of this event, the higher capacity cells in battery portion 34 still contain a limited amount of remaining energy sufficient for the operator to perform various tasks. By using the drop in voltage attributed to cell portion 36 as a milepost at which to provide a notification, the user will understand that he has only a limited amount of remaining energy available from the higher capacity battery portion 34 and he can act appropriately to complete any data or memory transfers or other tasks which require additional energy from the battery.

Accordingly, then, circuit 10 is provided with sensing means for sensing a characteristic of battery 12 during the aforementioned first mode of operation. The sensed characteristic is indicative of energy remaining in the lower capacity battery portion 36 of battery 12 during the first mode of operation. The characteristic preferred in the embodiment of FIG. 2 is the voltage appearing at battery terminal 18 of battery 12. The battery voltage appearing at terminal 18 of battery 12 is indicative of the remaining energy in battery portion 36 since this voltage will decrease when the energy of battery portion 36 is nearly entirely depleted. More specifically, sensing means in the form of current conducting line 52 is connected between line 20 (which is electrically connected to terminal 18 of battery 12) and a first input terminal 54 of comparator means 56. For purposes hereinafter to be explained, line 52 contains a diode 58 for providing a relatively fixed forward voltage drop. Thus, a voltage is provided to comparator 56 via line 52 which is equal to the voltage appearing at battery terminal 18 minus the slight voltage drop across diode 58.

Comparator means 56 may be comprised of a type well known in the art. One such comparator, in integrated circuit form, which may be particularly well adapted for use in the circuit 10 is manufactured under the catalogue number ICL7673 by Intersil Inc., a subsidiary of the General Electric Company.

Circuit 10 is also provided with means for providing a reference signal in the form of current conducting line 60 electrically connecting the positive terminal 42 of first portion 34 of battery 12 with a reference input terminal 62 of comparator means 56. Thus, the reference providing means 60 provides a voltage input to comparator 56 which is equal to the voltage at the positive terminal 42. The voltage at positive terminal 42 is the output voltage of higher capacity battery portion 34. The difference between the voltage at terminal 18 and the voltage at positive terminal 42 is, of course, equal to the voltage across second battery portion 36. Thus, it is apparent that the circuit of the embodiment of FIG. 1 provides means for monitoring the voltage across the lower capacity portion 36 of battery 12. More specifically, monitoring means are provided in the form of sensing means 52 and reference means 60 which permit the voltage across lower capacity battery portion 36 to be monitored.

During operation of circuit 10 in the first mode of operation, that is when the cell or cells in battery portion 36 have remaining deliverable energy, this voltage difference is substantially constant since the voltage across battery portion 36 is substantially constant. When, on the other hand, the energy has been substantially depleted from battery portion 36, the voltage at terminal 18 will rapidly decrease toward the voltage at terminal 42 and, thus, the aforementioned voltage difference will decrease. As will become apparent, circuit 10 is switched from the first mode of operation to the second mode of operation in response to decrease in the aforementioned voltage difference. In this manner then, the sensed voltage characteristic is indicative of the energy remaining in the lower capacity battery portion 36 of battery 12 during the first mode of operation, that is to say, the sensed voltage characteristic is indicative of the near depletion of energy from lower capacity portion 36.

Accordingly then, comparator means compares a sensed characteristic of battery 12, namely, the voltage at battery terminal 18 (minus the voltage drop across diode 58), with a reference voltage, namely the voltage at terminal 42. The voltage drop across diode 58 is provided to ensure that the voltage across battery portion 36 need not drop to zero before the comparator means 56 switches circuit 10 from the first mode to the second mode of operation. Nonetheless, the voltage delivered by conducting line 52 to comparator input terminal 54 is indicative of the energy remaining in battery portion 36 since the voltage received by terminal 54 will vary in accordance with the energy remaining in battery portion 36; that is, will rapidly decrease upon the depletion of energy from battery portion 36.

In the first mode of operation, that is when the lower capacity cell or cells in second battery portion 36 still contain substantial remaining deliverable energy, the voltage at terminal 18 is higher than the voltage at terminal 42 by more than the voltage drop across diode 58. In this mode comparator means 56, provides a first low (near ground) output signal to gate 64 of switch transistor 16 via current conducting line 66 maintaining switch transistor 16 in a conducting state and thus delivering energy from each cell in battery 12 to load 14 through the aforedescribed first circuit path. Furthermore, in the first mode of operation, comparator means 56 provides a second high (near the voltage of source terminal 46) output signal to the gate 68 of switch transistor 40 via current conducting line 70 thereby maintaining switch transistor 40 in the non-conducting state and preventing the delivery of energy through the aforementioned second current path.

When, however, the deliverable energy of lower capacity cell portion 36 is nearly depleted, the voltage across the cell portion 36 will substantially decrease. Thus, the sensed voltage characteristic is then indicative of the near depletion of energy from the lower capacity cell portion 36 during the first mode of operation. When the voltage at terminal 18 drops to a level whereby the voltage at comparator input terminal 54 is less than the reference voltage at comparator input terminal 62, comparator means 56 provides a high output signal to gate 64 of transistor 16 thereby maintaining transistor 16 in a non-conducting state and preventing the flow of current through the aforementioned first current path. At the same time, comparator means 56 provides a low output signal to gate 68 of transistor switch 40 thereby maintaining switch 40 in a conducting state and delivering energy to load 14 via the aforementioned second current path. In addition, the low output signal provided to transistor switch 40 is also provided to notification means 72 which upon receipt thereof provides a visual, audio or other indication discernible by the operator of the energy-using device. It may be necessary to include in circuit 10 various means for latching the circuit 10 in the second mode of operation to prevent switching back and forth between the two modes of operation because of voltage variations across cell portion 36 otherwise resulting from disconnection of cell portion 36 from load 14.

Thus, it is observed that switching means, in the form of transistor switches 16 and 40, switches circuit 10 from a first mode of operation to a second mode of operation in response to the comparison, by comparator 56, of a battery voltage characteristic with a reference signal. Switching occurs in response to the sensed characteristic of battery 12 indicating that the energy of the second portion of cells 36 has been, for all practical purposes, depleted. Said another way, switching occurs in response to a decrease in the monitored voltage across lower capacity cell portion 36. It is further observed that notification means 72 is responsive to the same comparison. Upon such notification, the operator of the device is aware of the availability of only a limited amount of delivered energy from the higher capacity cells in first portion 34 of battery 12.

It is noted from the description of the invention herein before set forth that the switching of the circuit from the first to the second mode of operation prevents further drain of energy from the nearly depleted cell portion 36 since the switching of transistor 16 to a non-conducting state effectively disconnects cell portion 36 from the load 14. Cell portion 36 is disconnected to prevent over-discharge of cell portion 36 which could otherwise permanently damage and shorten the useful life of the cell portion 36.

Figure 3:
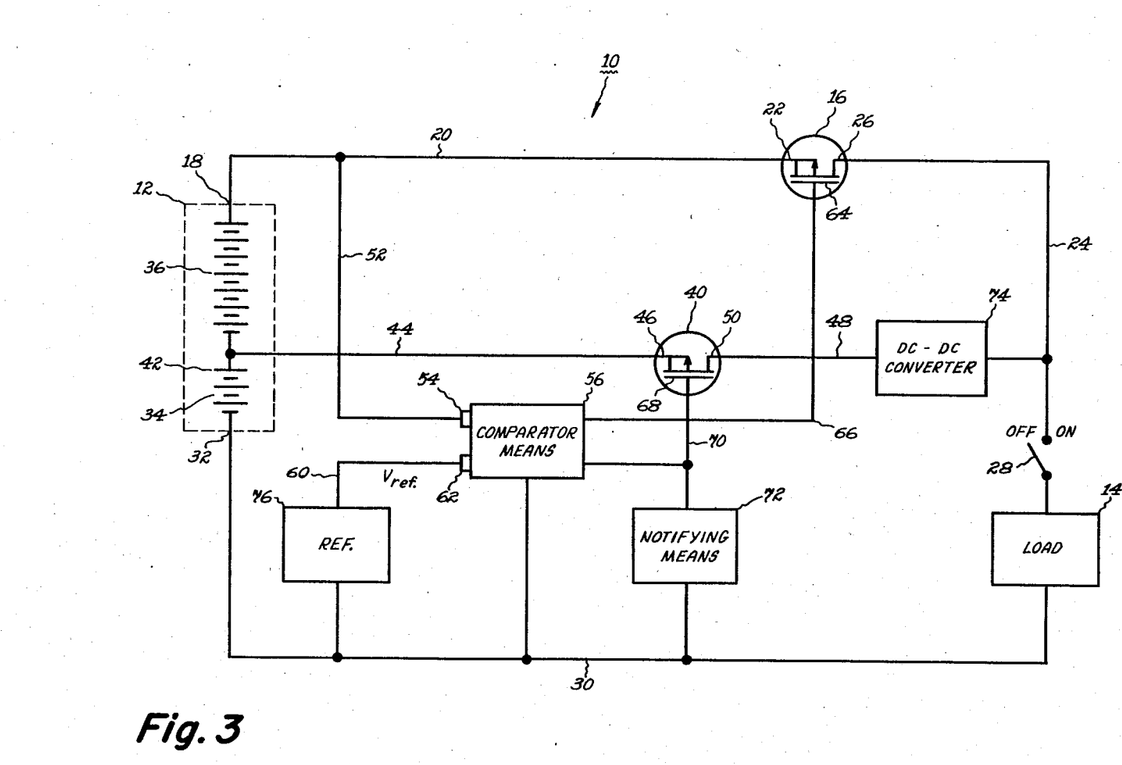
FIG. 3 depicts a schematic circuit diagram of a second embodiment of the present invention.

Referring now to FIG. 3, a second embodiment of the present invention is depicted. In describing the elements and operation of this embodiment, corresponding elements in each embodiment of FIG. 2 and FIG. 3 will be given the same numerical designation.

The embodiment depicted in FIG. 3 differs from that of FIG. 2 principally in the relative number of cells in battery portions 34 and 36. In the embodiment of FIG. 2, the number of lower capacity cells in battery portion 36 was selected such that depletion of energy from each of the lower capacity cells would not result in a decrease in voltage supplied by battery 12 to a voltage level below the minimum operating voltage of the energy-using device. In other words, after all of the deliverable energy had been depleted from the lower capacity cells of portion 36, the cumulative voltage of the higher capacity cells of portion 34 of battery 12 was still above the minimum operating voltage of the energy-using device. Where, however, as in the FIG. 3 embodiment, the cumulative voltage of the higher capacity cells is below the minimum operating voltage of the device, a DC to DC voltage converter 74 must be inserted in the second circuit path preferably between transistor switch 40 and load 14. Thus, during the second mode of operation, voltage converter 74 increases the voltage of battery portion 34 to a level equal to or above the minimum operating voltage of the device.

It may also be observed that the FIG. 3 embodiment includes a separate reference generator 76 which provides a reference signal to reference input terminal 62 of comparator means 56. Since the voltage at the positive terminal 42 of first battery portion 34 is lower than the operating voltage of the energy-using device, the voltage at positive terminal 42 is inappropriate for use as a reference. Rather, a reference generator 74 may be established at a predetermined level to provide a reference voltage just slightly above the operating voltage of the energy-using device.

Except for the differences described above, the embodiments of FIG. 2 and FIG. 3 are identical in design and operation in all respects.

Figure 4:
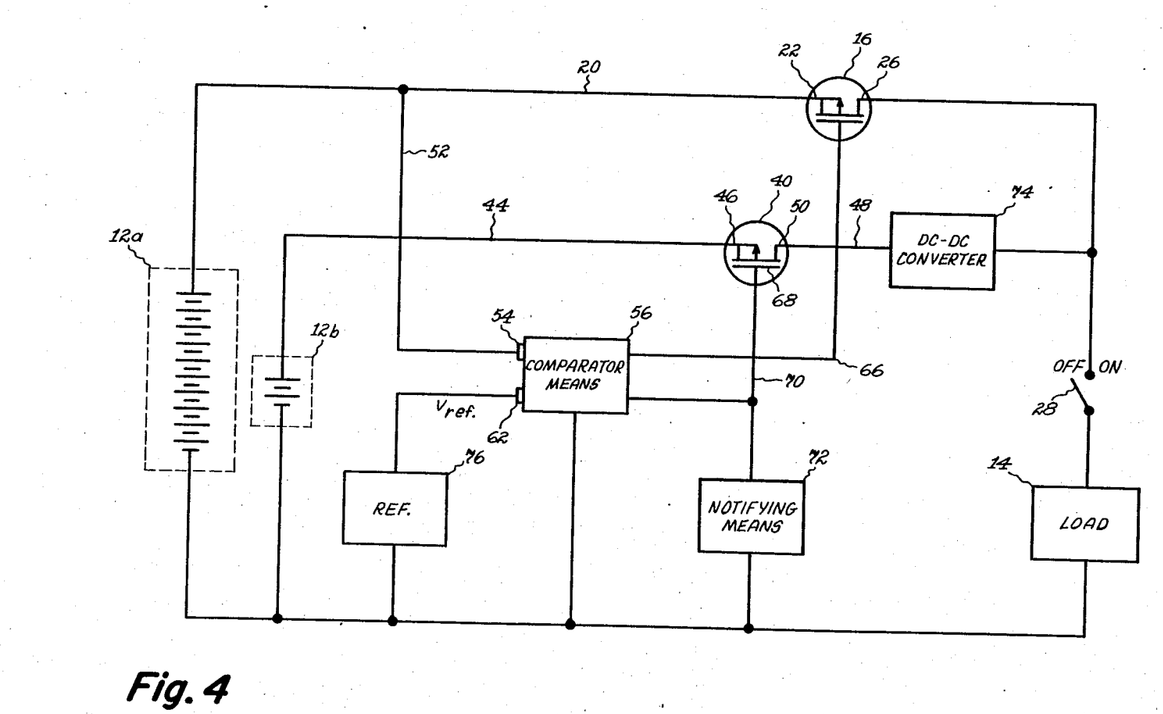
FIG. 4 depicts a schematic circuit diagram of a third embodiment of the present invention.

Referring now to FIG. 4, a third embodiment of the present invention is depicted. In describing the elements and operation of this embodiment, corresponding elements of FIG. 3 and FIG. 4 will be given the same numerical designation.

The embodiment depicted in FIG. 4 differs from that of FIG. 3 principally in one respect. Whereas the embodiment of FIG. 3 is comprised of a single battery with first and second cell portions connected in series, the embodiment of FIG. 4 is comprised of two batteries connected in two parallel circuit paths with respect to each other. More specifically, in the FIG. 4 embodiment a first battery 12a is connected to load 14 via the first circuit path while a second battery 12b, in parallel with battery 12a, is connected to load 14 via the second circuit path. Furthermore, the number of cells in battery 12a is selected such that the battery voltage (the cumulative voltage of the cells of battery 12a) is higher than the minimum operating voltage of the energy-using device. Hence, in the first mode of operation energy is supplied to the load 14 only by battery 12a.

When the deliverable energy capacity of battery 12a has been depleted, the voltage of battery 12 rapidly decreases. The decreased voltage across battery 12a is compared by comparator 56 with a reference voltage set slightly above the minimum operating voltage. When the voltage across battery 12a decreases to the reference voltage, comparator 56 is operable to switch transistor 16 to the non-conducting state and transistor 40 to the conducting state in the manner heretofore described with respect to the embodiment of FIG. 3. Switching from the first mode of operation to the second mode of operation terminates the delivery of energy to load 14 from battery 12a via the aforementioned first circuit path and provides for the delivery of energy to load 14 from battery 12b via the second current path. Battery 12b is comprised of a lesser number of cells than is battery 12a and, accordingly, the voltage across battery 12b must be increased by DC to DC voltage converter 74 in order to maintain the voltage applied to load 14 at a level above the minimum operating voltage of the energy-using device. Except for the differences described above, the embodiments of FIGS. 3 and 4 are identical in design and operation in all respects.

Accordingly then, the embodiments of the present invention provide various advantages over circuits known in the prior art. Specifically, one of the more significant advantages resides in the feature of the present invention which permits notification of the operator of the energy-using device that the remaining deliverable energy capacity in the nickel-cadmium battery is low at a time when sufficient energy is yet available for the operator to perform essential tasks before the device becomes inoperable. The invention permits these advantages to be achieved without providing a large back-up battery having the same number of cells as the battery primarily relied upon for power. In fact, the embodiments of FIG. 2 and FIG. 3 permit these advantages to be achieved without the addition of any additional cells to the battery. The embodiment of FIG. 4 achieves these advantages with only a minimal number of additional cells. Accordingly, the circuit of the present invention uses a battery system which is less costly than battery systems previously known in the art.

While the preferred embodiments have been fully described and depicted for the purpose of explaining the principles of the present invention, it will be appreciated by those skilled in the art that modification substantiations and changes may be made thereto without departing from the scope of the invention set forth in the appended claims.

We claim:

1. A circuit for supplying energy to the load of an energy-using device having a minimum operating voltage below which said device is not fully operable, said circuit comprising:

a battery comprised of a plurality of electrochemical cells connected in series with respect to each other and with respect to said load, said plurality of cells comprised of a first portion of said plurality of cells and a second portion of said plurality of cells, each cell in said first portion having a deliverable energy capacity in excess of the deliverable energy capacity of each cell in said second portion, said circuit operable in a first mode to deliver energy to said load simultaneously from each cell in said plurality and operable in a second mode to deliver energy to said load from only said first portion of said plurality of cells; wherein the number of cells in said first portion is less than the number of cells in said second portion and the voltage delivered by said first portion of said plurality of cells is less than the voltage delivered by said second portion of said plurality of cells;

means disposed in said circuit for sensing a characteristic of said battery during said first mode of operation, said characteristic indicative of the energy remaining in said second portion of said plurality of cells during said first mode of operation; and means for switching said circuit from said first mode to said second mode in response to said sensed characteristic indicating near depletion of deliverable energy from said second portion of said plurality of cells.

2. The invention as set forth in claim 1 further comprising:

voltage converting means operable during said second mode for increasing said voltage delivered by said first portion of said plurality of cells to a voltage not less than said minimum operating voltage of said energy-using device.

3. The invention as set forth in claim 2 wherein said sensing means senses a voltage characteristic indicative of the energy remaining in said second portion of said plurality of cells.

4. The invention as set forth in claim 2 further comprising:

means for providing a notification signal discernible by the operator of said energy-using device that said circuit is in said second mode of operation.

5. The invention as set forth in claim 2 further comprising:

means for generating a reference signal; and means for comparing said sensed characteristic with said reference signal, said switching means responsive to said comparison to switch said circuit from said first mode of operation to said second mode of operation.

* * * * *